United States Patent
Rollins et al.

(10) Patent No.: US 6,356,749 B1
(45) Date of Patent: Mar. 12, 2002

(54) AUTOMATIC ADAPT CIRCUIT FOR CIRCUMVENTING DEMODULATOR TRANSIENTS IN RADIO RECEIVER

(75) Inventors: Norman T. Rollins, Sunrise; Man Wa Wong, Pembroke Pines; Steven P. Hoggarth, Sunrise, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/344,192

(22) Filed: Jun. 24, 1999

Related U.S. Application Data

(60) Provisional application No. 60/106,983, filed on Nov. 4, 1998.

(51) Int. Cl.$^7$ .............................. H04B 1/10; H04B 1/26; H04B 1/08
(52) U.S. Cl. ........................ 455/334; 455/296; 455/311; 455/312; 455/318; 455/349
(58) Field of Search .................................. 455/296, 312, 455/307, 218, 219, 214, 324, 337, 340; 329/300, 304, 311, 318, 319, 345, 349, 351; 375/316, 317, 318, 319

(56) References Cited

U.S. PATENT DOCUMENTS

| | | | | |
|---|---|---|---|---|
| 4,329,714 A | * | 5/1982 | Pritchard | 358/198 |
| 4,829,594 A | * | 5/1989 | Heck et al. | 455/334 |
| 5,212,826 A | * | 5/1993 | Rabe et al. | 455/214 |
| 5,659,582 A | * | 8/1997 | Kojima et al. | 375/345 |

* cited by examiner

Primary Examiner—Daniel Hunter
Assistant Examiner—Meless Zewdun
(74) Attorney, Agent, or Firm—Frank M. Scutch, III

(57) ABSTRACT

An auto-adapt circuit (200) for altering radio receiver parameters due to demodulator transients and preventing the loss of received information. The auto-adapt circuit includes a detector circuit (215) connected to the output of a receiver demodulator (203) and a switch (219) controlled by the detector circuit (215). The detector circuit (215) detects a transient voltage at an upper threshold limit or at a lower threshold limit such that a transient at an output of the receiver demodulator will actuate the at least one switch for varying demodulator coupling parameters of the radio receiver.

18 Claims, 3 Drawing Sheets

AUTOMATIC ADAPT CIRCUIT FOR CIRCUMVENTING DEMODULATOR TRANSIENTS IN RADIO RECEIVER

CROSS REFERENCE

This application claims the benefits of U.S. Provisional Application No. 60/106,983 filed Nov. 4, 1998 and assigned to Motorola, Inc.

TECHNICAL FIELD

This invention relates in general to radio receivers and more particularly to the avoidance of lost data and information due to long receiver recovery times due to demodulator transients.

BACKGROUND

In some instances, a radio frequency (RF) receiver may, by virtue of its design, have signal alternating current (AC) coupling circuitry where a highly coupled signal using a substantially high resistor-capacitor (RC) time constant will have a slow "attack time" in view of this signal coupling. That is, since the signal coupling circuitry is generally used to block direct current (DC) while still passing very low frequencies, some data or information will be misprocessed when first received. More specifically, the first syllable of a speech message or the initial bit(s) of a data stream will be lost since a center slicer (discussed hereinafter) will not properly convert data from the demodulator immediately following a signal transient.

As is well known in the art, a signal transient is any non-periodic perturbation in the received signal. There are any number of causes of signal transients which result in the loss of information. One of these is commonly referred to as "netting error". Netting error occurs where the transmitted frequency and received frequency are not identical. This tends to cause a transient in the form of a DC shift at the output of the receiver demodulator. This in-turn causes errors in decoding data such as private line (PL), digital private line (DPL), digital tone multi-frequency (DTMF), etc. Where digital information from the receiver demodulator is converted by the center slicer or analog-to-digital converter (ADC) which misrepresents the original data.

Thus, it is desirable to know when a demodulator transient occurs so that it can be compensated for such that an ADC can act as a true center slicer to the extent that information can be correctly interpreted by a decoder and/or microprocessor as quickly as possible following the transient. If the transient is not detected and compensated for quickly, the center slicer will take a greater amount of time to output valid data. During that time period when the DC offset is not detected and compensated for, the center slicer generally outputs a series of constant 1's or 0's. A decoder or microprocessor then attempts to decode this erroneous information which cannot be done. This ultimately means that the radio receiver will be muted during this time period that erroneous information is sent to the decoder and any incoming voice will be lost until that DC offset can again properly compensated for.

The above system is illustrated in prior art FIG. 1 where a typical receiver circuit 100 includes a receiver detector 101, and demodulator 103. As seen in FIG. 2A, when an RF signal is first received and netting error is present, the output of the demodulator is DC shifted where the RF signal rides upon the DC shifted signal by some predetermined amount. This signal is then typically coupled i.e. DC blocked using an resister-capacitor time constant formed using capacitive coupling 105 and a load 107. This coupled signal is then input to a filtering network 109. As seen in FIG. 2B, upon the occurrence of the DC shift, the input signal is initially shifted up to the predetermined DC offset where its DC offset then decays exponentially at a rate depending on the specific resister-capacitor (RC) time constant selected. FIG. 2C depicts the output of the center slicer 111 before being input to the decoder 113 where upon occurrence of the DC shift, the input of the decoder is input with a continuous series of 1's. Since this erroneous information cannot be decoded, information is lost until the DC offset shown in FIG. 2B decays close enough to "center" that the center slicer output again represents the data accurately enough to be decoded.

One method currently used to mitigate this problem is to speed up the RC time constant for a predetermined period of time through the use of software in the receiver. Although some incoming information is still unavoidably lost due to the DC shift and also because the AC portion of the signal becomes highly attenuated via the smaller RC time constant, this method allows the receiver to recover at a much quicker rate. This method is commonly referred to as an "adapt function" which allows the receiver to speed up its attack time. If the user knows that this is going to be an issue and information may be lost, for example in a "scan mode" where one knows that netting error will occur when the receiver "lands" on the channel if a carrier exists, the adapt function can be initiated. This ultimately allows the receiver to attack and recover an incoming signal at a higher rate such that incoming information lost due to a demodulator transient is minimized. However, this method only works when software has apriori knowledge that information will be lost and is not self-adaptive. In other words, it is not a solution to the most common situation where the receiver is operated idle, or muted, until information is received, and software does not know when to change the mode of the receiver to alter its time constant.

Thus, the need exists to provide a circuit that can automatically adapt to receiver demodulator transients such as a DC shift due to netting error, in order to prevent the loss of incoming information or data.

DETAILED DESCRIPTION OF THE PREFERRED EMBODIMENT

Figure 3:
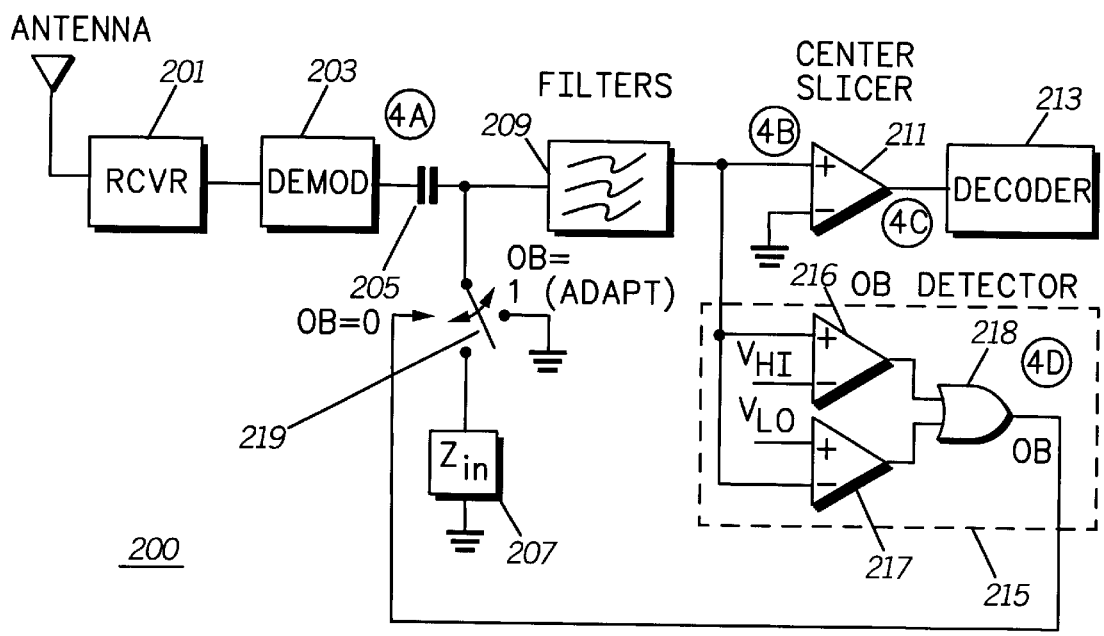
FIG. 3 is radio receiver using an auto-adapt circuit in accordance with the preferred embodiment of the invention.

Referring now to FIG. 3, a radio receiver system with auto-adapt system 200 includes a receiver detector 201 and demodulator 203 both of which are well known to those skilled in the art. A direct current (DC) blocking circuit in the form of an resistor-capacitor (RC) combination illustrated by Zin load 207 and coupling capacitor 205 works to couple the demodulated signal to one or more filtering circuit(s)

209. The filtering circuits act to tailor the demodulated signal to achieve a desired frequency response. It should be recognized that although one coupling capacitor is shown, additional coupling capacitors may also be implemented in other circuits such as after the filtering circuit(s) 209 in order to block accumulated offset voltages in the filter path.

At the output of the filtering circuit 209, the filtered signal is then supplied to both a center slicer 211 and an out-of-bounds (OB) detector 215. The center slicer works as an analog-to-digital converter (ADC) by converting the analog waveform to digital data by comparing the signal at the output of filters 209 to some predetermined value. When the signal at the output of filters 209 is greater than the predetermined value, a binary 1 is output by the center slicer. When the signal at the output of filters 209 is less than the predetermined value, a binary 0 is output by the center slicer. But the center slicer will output a constant binary 1 or 0 if the signal at the output of the filters remains always above or below, respectively, the predetermined value over a period of time. Thus, the center slicer 211 converts analog data to a digital format by comparing the composite signal, i.e. an AC signal riding on a DC offset, to a fixed reference voltage. The converted data is subsequently conveyed to a decoder 213 where it is interpreted. The decoder may be implemented in a microprocessor (not shown).

The OB detector 215 includes one or more comparators 216, 217 that use an input from the filter circuit 209 and are set to detect when the signal exceeds a low and high voltage threshold which are normally outside the signal swing when the signal DC offset is equal to the predetermined value it is compared against by the center slicer 211. It should be evident that the comparators 216, 217 may be analog or digital comparators or the like. When either of these thresholds are exceeded this triggers an "OR" gate 218 that acts to actuate a switch 219. Switch 219 works to control the value of the RC combination by switching between the Zin load 207 and an impedance significantly lower than Zin load 207. It should be evident to those of ordinary skill that Zin load 207 may not be an actual resistance but may be representative of an input filter impedance, and further the input filter impedance might be formed by a switched capacitor network. Thus, the value of the RC time constant is altered thereby reducing the time in which the DC offset at the output of filter 209 decays back to the predetermined value being compared against by the center slicer 211.

It is important to recognize that the demodulator 203 output voltage cannot be compared to an absolute threshold. The absolute value of the DC offset is immaterial since it matters only the amplitude and direction of the voltage shift. By way of example, if the demodulator 203 output is 4 volts and shifts to 6 volts, while the opposite side of the coupling capacitor is initially 0 volts and shifts to 2 volts in response to a transient, the signal will exponentially decay back to 0 volts. The same response would be obtained on the filter side of the coupling capacitor 203 if the demodulator DC offset shifted form −3 volts to −1 volt i.e. the AC coupling capacitor acts to the block DC voltage. Thus, the invention allows comparison against a fixed threshold voltage on the filter side of the coupling capacitor 203. Accordingly, if the signal were normally 0.8 volts peak, the voltage thresholds might be set at v-hi of 1 volt and v-lo of −1 volt to detect any demodulator transient.

Figure 1:
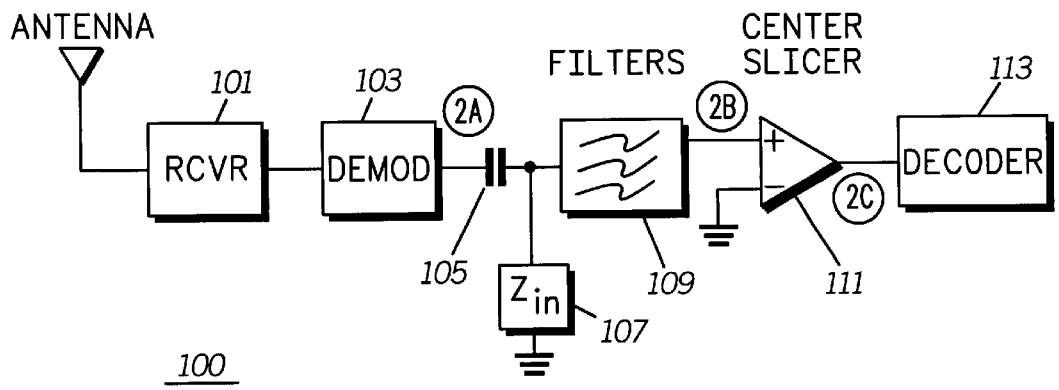
FIG. 1 is a prior art block diagram of a typical receiver system.
Figure 2A:
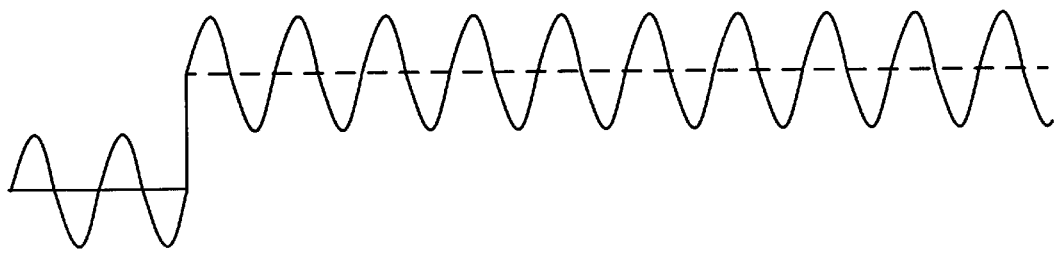
FIGS. 2A, 2B and 2C are graphic diagrams showing the output signals from various stages of the receiver shown in FIG. 1.
Figure 2B:
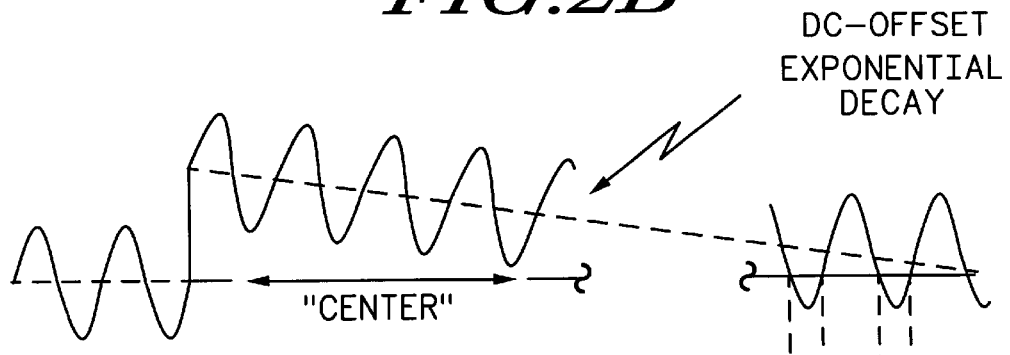
Figure 2C:
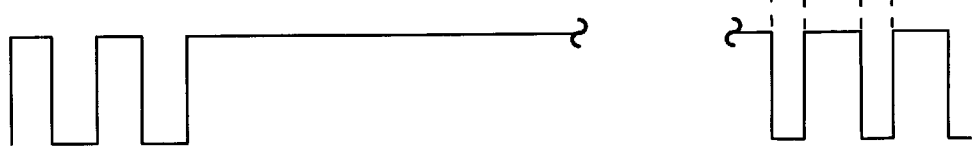
Figure 4A:
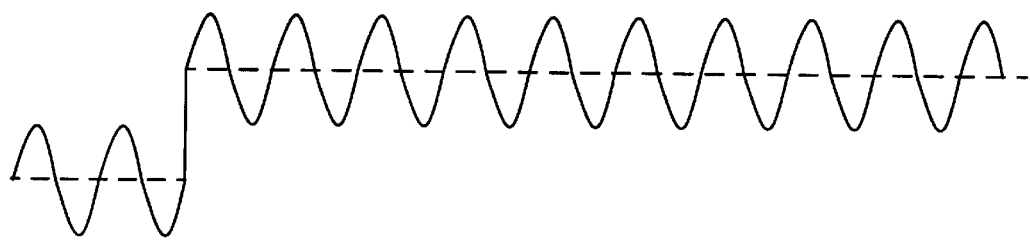
FIGS. 4A, 4B, 4C and 4D are graphic diagrams showing output of corresponding stages of the radio receiver with auto-adapt circuit according to the preferred embodiment of the invention shown in FIG. 3.
Figure 4B:
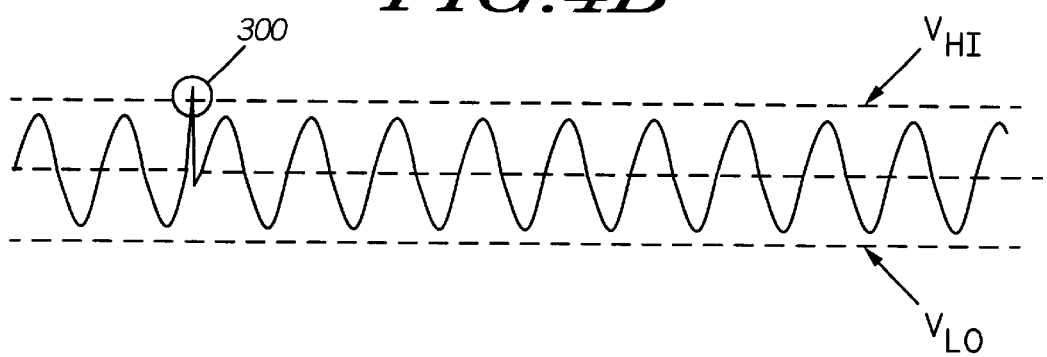
Figure 4C:
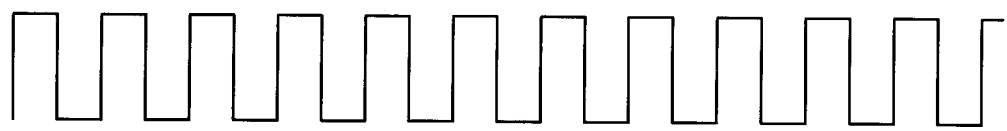
Figure 4D:

In FIGS. 4A through 4D, the output of the respective areas of the receiving system are shown with auto-adapt circuit 215. Thus, FIG. 4A like prior art FIG. 1 shows an output of the receiver demodulator 203 having a DC offset shift due to netting error or the like. In FIG. 4B, the output of the filter network 209 is illustrated where the filtered output exceeds a predetermined threshold (v-hi). This is detected by the auto-adapt circuit 215 which then produces a control signal or pulse shown in FIG. 4D to actuate the switch 219 which causes the output of filter network 209 to immediately decay forming the voltage transient 300. As seen in FIG. 4C, the data at the input to the center slicer 211 may be corrupted but only for a short period which turns out as an erroneous input data to the decoder 213, but only for a short time. However as shown, the data may also be completely uncorrupted. Thus, the auto-adapt feature of the invention has detected the DC offset level beyond a predetermined threshold and automatically altered the RC combination of the coupling circuit so data input into the center slicer 211 will continue to be accurately converted to digital data.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An auto-adapt circuit for altering radio receiver parameters due to demodulator transients and preventing the loss of received information comprising:

at least one detector circuit connected to the output of a receiver demodulator;

at least one switch controlled by the detector circuit; and wherein the at least one detector circuit detects a DC offset shift at an upper threshold limit or at a lower threshold limit such that the DC offset shift at an output of the receiver demodulator will actuate the at least one switch for varying dimodulator coupling parameters of the radio receiver.

2. An auto-adapt circuit as in claim 1, wherein coupling parameters of the at least one demodulator circuit are varied by changing a resister-capacitor (RC) time constant.

3. An auto-adapt circuit as in claim 1, wherein the at least one detector circuit includes at least one comparator.

4. An auto-adapt circuit as in claim 3, wherein the at least one comparator is a digital comparator.

5. An auto-adapt circuit as in claim 1, wherein the at least one detector circuit includes a first and second comparator circuit for setting the upper and lower threshold limit and an or gate for providing an actuating signal to the at least one switch.

6. An auto-adapt circuit as in claim 1, wherein at least one filter is positioned between the demodulator and the at least one detector circuit for providing a desired frequency response.

7. An auto-adapt circuit as in claim 1, wherein the at least one detector circuit is in parallel with a center slicer for converting analog data to a digital bit stream.

8. An auto-adapt circuit as in claim 7, further comprising a decoder attached to the output of the center slicer for decoding information from the digital bit stream.

9. A radio receiver system including an adaptive circuit for detecting and responding to the presence of a DC offset shift at the output of a demodulator comprising:

a demodulator circuit for receiving detected information;

at least one filtering circuit for receiving demodulated information;

at least one center slicer for converting the filtered information into a digital bit stream;

a decoder circuit for decoding data within the digital bit stream;

at least one detector circuit receiving information from the at least one filtering circuit for detecting a DC offset shift such that the signal crosses either above or below predetermined thresholds; and at least one switch circuit responsive to the at least one detector for altering a receiver attack time and preventing loss of received information due to receiver DC offset shift.

10. A radio receiver system as in claim 9, wherein the receiver attack time is altered by varying an resistor-capacitor (RC) time constant in a coupling circuit.

11. A radio receiver system as in claim 10, wherein the coupling circuit couples the demodulator circuit and the at least one filtering circuit.

12. A radio receiver system as in claim 10, wherein the at least one detector circuit is comprised of at least one comparator for comparing the upper and lower signal threshold levels and actuating the at least one switch.

13. A method for automatically adapting a radio receiver to circumvent demodulator DC offset shift comprising the steps of:

providing a demodulated output signal from a demodulator circuit;

alternating current (AC) coupling the demodulator output signal to a center slicer circuit;

monitoring the output of the demodulated output signal to detect the presence of a DC offset shift;

detecting a DC offset shift beyond an upper voltage limit or lower voltage limit; and altering an resistor capacitor (RC) time constant of the AC coupled signal to provide a substantially rapid decay time of the DC offset for preventing loss of received information.

14. A method for automatically adapting a radio receiver as in claim 13, wherein the DC offset shift is detected using at least one comparator for comparing the signal against an upper and lower DC voltage limit.

15. A method for automatically adapting a radio receiver as in claim 14, wherein the at least one comparator is a digital comparator.

16. A method for automatically adapting a radio receiver as in claim 13, wherein the RC time constant is switched.

17. A method for automatically adapting a radio receiver as in claim 13, further comprising the step of:

filtering the demodulator output signal for providing a tailored frequency response to the center slicer circuit.

18. A method for automatically adapting a radio receiver as in claim 13, further comprising the step of:

decoding the output of the center slicer circuit for providing decoded information.

* * * * *